(12) United States Patent
Parmee

(10) Patent No.: US 11,221,302 B2
(45) Date of Patent: Jan. 11, 2022

(54) PRODUCT SCANNING

(71) Applicants:Cheyney Design & Development Ltd., Royston Herfordshire (GB); Richard Parmee, Royston Hertfordshire (GB)

(72) Inventor: Richard Parmee, Royston Hertfordshire (GB)

(73) Assignee: Cheyney Design & Development Ltd.

( * ) Notice: Subject to any disclaimer, the term of this patent is extended or adjusted under 35 U.S.C. 154(b) by 236 days.

(21) Appl. No.: 16/491,641

(22) PCT Filed: Mar. 6, 2018

(86) PCT No.: PCT/GB2018/050558
§ 371 (c)(1),
(2) Date: Sep. 6, 2019

(87) PCT Pub. No.: WO2018/162887
PCT Pub. Date: Sep. 13, 2018

(65) Prior Publication Data
US 2021/0131982 A1     May 6, 2021

(30) Foreign Application Priority Data

Mar. 6, 2017 (GB) ..................................... 1703544

(51) Int. Cl.
| | |
|---|---|
| *G01N 23/18* | (2018.01) |
| *G06T 7/70* | (2017.01) |
| *G01N 23/04* | (2018.01) |
| *G01N 23/083* | (2018.01) |
| *G06T 7/00* | (2017.01) |

(52) U.S. Cl.
CPC ............. *G01N 23/18* (2013.01); *G01N 23/04* (2013.01); *G01N 23/083* (2013.01); *G06T 7/001* (2013.01); *G06T 7/70* (2017.01); *G01N 2223/42* (2013.01); *G01N 2223/646* (2013.01); (Continued)

(58) Field of Classification Search
None
See application file for complete search history.

(56) References Cited

U.S. PATENT DOCUMENTS

| | | | |
|---|---|---|---|
| 2010/0202694 A1* | 8/2010 | Kabumoto | ............ G01N 23/04 382/190 |
| 2012/0327227 A1 | 12/2012 | Ikeda et al. | |

OTHER PUBLICATIONS

International Preliminary Report on Patentability for International Application No. PCT/GB2018/050558, dated Sep. 10, 2019, 11 pages.

(Continued)

*Primary Examiner* — Hoon K Song
(74) *Attorney, Agent, or Firm* — RatnerPrestia

(57) ABSTRACT

A method for detecting defects in a product (10), such as food packaging, having a range of thicknesses of cross-section through which detection will take place; the method comprising: scanning the product (10), with for instance x-rays, to identify one or more light regions, and one or more dense regions of the product; and creating a first signal path and a second signal path from a single set of scanning data, and conditioning: the first signal path for detection of defects in the one or more dense regions; and the second signal path for detection of defects (14*a*, 14*b*, 14*c*) in the one or more light regions. Advantageously, detection of defects in the contents (dense region) of a product and the seal (light region) of the product is conducted simultaneously.

27 Claims, 6 Drawing Sheets

Figure 1:
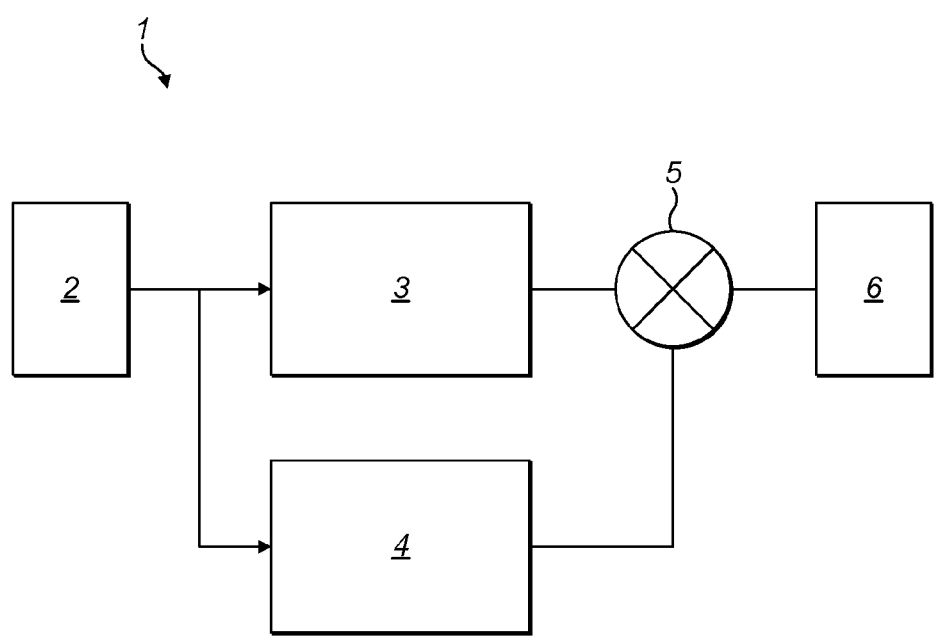

(52) U.S. Cl.
CPC ............... *G01N 2223/652* (2013.01); *G06T 2207/10116* (2013.01); *G06T 2207/30128* (2013.01)

(56) References Cited

OTHER PUBLICATIONS

International Search Report and Written Opinion for International Application No. PCT/GB2018/050558, dated Sep. 14, 2018, 16 pages.

\* cited by examiner

PRODUCT SCANNING

CROSS REFERENCE TO RELATED APPLICATIONS

This application is the U.S. National Stage filing of International Appln. No. PCT/GB2018/050558, filed Mar. 6, 2018, which claims priority to GB Application No. 1703544.5, filed Mar. 6, 2017, each of which being incorporated herein by reference for all purposes.

FIELD OF THE INVENTION

The present invention relates to a method for detecting defects in a product. In particular, the present invention relates to a method for detecting defects in a product having a range of thicknesses of cross-section through which detection will take place. The present invention also relates to a detector system, for detecting defects in products, and a method for multi-point calibration of an X-ray detection apparatus.

BACKGROUND OF THE INVENTION

In the field of end-of-line X-ray detection for the food and pharmaceutical industries, manufactured products are inspected at high speed for defects such as foreign bodies (e.g. metal, glass, stone and/or bone) and manufacturing non-conformities (e.g. seal defects). Foodstuffs are often packaged to maintain sterility, and this packaging often involves plastic films with seals. It is of concern that the seal is complete and does not have food trapped in it—such a condition could create a non-sterile channel into the contents of the packaging. Additionally, products may be packaged in glass jars, where features of the jar may obscure a foreign body.

An X-ray system for detecting foreign bodies, etc. in products needs to have sufficient power to penetrate the whole product, and create a high-contrast image to identify any dense contaminant. By contrast, the seal region will be very thin and, owing to the pressure of the sealing mechanism, any food is likely to be substantially (though not completely) extruded away from the region of the seal. Conversely, the structure of a glass jar may be very thick, obscuring a dense contaminant. Calibration of the system is, typically, optimised for the primary detection purpose. If that primary purpose is detection of dense contaminants, an image of the seal will be very light with minimal contrast. If the primary purpose is detection of any material in the seal, an image of the food matrix will be quite black and, therefore, unsuitable for detection of dense contaminants/ foreign bodies. As such, a system optimised to detect foreign bodies in the product is not suitable for detecting sealing defects, and vice versa.

SUMMARY OF THE INVENTION

The present invention is aimed at providing a method and apparatus for scanning, which is suitable for detecting both foreign bodies and seal defects.

According to a first aspect, the present invention provides a method for detecting defects in a product having a range of thicknesses of cross-section through which detection will take place; the method comprising:

scanning the product to identify one or more light regions, and one or more dense regions of the product; and creating a first signal path and a second signal path from a single set of scanning data, and conditioning: the first signal path for detection of defects in the one or more dense regions; and the second signal path for detection of defects in the one or more light regions.

Preferably, using data relating to the one or more dense, or one or more light regions so as to define one or more masked regions, in which masked region(s) little or no detection of defects occurs, in order to improve detection of defects in the non-masked one or more light, or one or more dense regions.

Preferably, the method comprises X-ray detection. However, other forms of transmissive imagery may be used, for example those analogous to GPR (ground penetrating radar) or LU (laser ultrasound).

Preferably, the method comprises utilising geometric data relating to one or more dense, or one or more light regions to define the one or more masked regions. Preferably, dilating the outline of the data relating to the one or more dense, or one or more light regions. Most preferably, utilising geometric data relating to the one or more dense, or one or more light regions and dilating such geometric data in order to further define the one or more masked regions.

Preferably, a periphery is created in the image used to detect defects in the dense region by scanning outwards for a grey scale that is higher than a preset level. Further preferably, an extended periphery is created by extending this (original) periphery by a set number of pixels, normal to the mean edge of the periphery. Further preferably, the masked region is then formed by the area circumvented by the extended periphery, which area is applied as a mask to the image used to detect defects in the light region.

Preferably, analysing data from one or more non-masked regions adjacent or surrounding the one or more masked regions.

Preferably, analysing data from one or more non-masked hotspots, such as corners of the product or regions aligned with the orientation of a filling device, which might give rise to a heightened risk of spillage Preferably, analysing data within a sub-region of the non-masked region or a sub-region of the non-masked hotspot and comparing that data to a discreet, preferably adjacent, further sub-region of the non-masked region or further sub-region of the non-masked hotspot, respectively. Most preferably, analysing data within a sub-region of the seal region and comparing that data to a discreet, preferably adjacent, further sub-region of the seal region so as to determine the location of a defect. Most preferably, analysing data using an adaptive threshold technique.

Preferably, optimising detection in the signal paths by manipulating multiplier and/or offset data; OR optimising detection in the signal paths by utilising a look-up table. Those skilled in the art will understand that the two signal paths take the same data but are subject to different conditioning, such as the application of different multipliers and/or offsets or linearity functions to selectively stretch and compress the data to achieve the respective goal of the signal path being either detection of defects in the one or more dense regions, or detection of defects in the one or more light regions.

Preferably, utilising scanning data so as to provide a visual output in the form:

a first image optimised to identify defects in the contents; and a second image optimised to identify defects in the seal.

Most preferably, utilising scanning data and adapting the first and/or second image so as to identify defects in hotspots or other regions of the product.

Preferably, scanning the product to provide a single data stream which is used to separately, but simultaneously, derive a low-energy contents range analysis of the product and a low-energy seal range analysis of the product.

Most preferably, further scanning in the form of a high-energy contents range scan.

Most preferably, scanning the product to identify at least a seal region of the product and a contents region of the product; and using data relating to the contents region or the seal region to define a masked region, in which masked region little or no detection of defects occurs, in order to improve detection of defects in the non-masked seal region or contents region.

Preferably, analysing X-ray product image data in order to establish the efficacy of a seal and/or any existence of contaminants in a seal, wherein one or more light regions, and/or one or more dense regions of the seal are identified and compared to an average grey-level (image grey scale) of the seal, which represents a suitable seal. Most preferably, the suitable seal is coded with a first colour, darker than average regions are coded in a second colour, and particularly darker than average regions are coded in a third colour, for ease of reference. The average grey scale is, of course, the point at which 50% of the pixels are lighter and 50% are darker. Predominantly, it is only those pixels that are darker—by an amount exceeding a certain threshold—that are of particular interest. Most preferably, wherein darker than average regions are coded with the third colour when they are approximately less than half the average grey-level of a satisfactory seal. Preferably, further comprising the upstream step of multi-point calibration of an X-ray detection apparatus, as defined in relation to the third aspect.

Preferably additionally comprising a method for multi-point calibration of an X-ray detection apparatus, for detecting defects in products, according to the third aspect of the invention.

According to a second aspect, the present invention provides a detector system, for detecting defects in products having a range of thicknesses of cross-section through which X-ray detection will take place; the system comprising:
X-ray scanning means;
means for utilising data from the scanning means for:
identifying one or more light regions, and one or more dense regions of said product; and
generating a first signal path and a second signal path from scanning data, and means for conditioning: the first signal path for detection of defects in the one or more dense regions; and the second signal path for detection of defects in the one or more light regions.

Preferably, defining one or more masked regions, in which masked region(s) little or no detection of defects occurs, in the one or more dense, or one or more light regions;
in order to improve detection of defects in the non-masked one or more light, or one or more dense regions.

Preferably comprising visual output means for displaying defects in the one or more light regions, and one or more dense regions, preferably at the same time.

Preferably, the visual output means is in the form:
a first image optimised to display defects in a contents of said product; and
a second image optimised to display defects in a seal of said product.

Most preferably, adapting the first and/or second image to display defects in hotspots or other regions of said product, preferably by colour.

Preferably comprising means for generating geometric data relating to one or more dense, or one or more light regions to define the one or more masked regions.

Preferably comprising means for dilating such geometric data to define the one or more masked regions.

Preferably comprising means for analysing data within a sub-region of the non-masked region or a sub-region of the non-masked hotspot and comparing that data to a discreet, preferably adjacent, further sub-region of the non-masked region or further sub-region of the non-masked hotspot, respectively. Most preferably comprising means for analysing data within a sub-region of the seal region and comparing that data to a discreet, preferably adjacent, sub-region of the seal region so as to determine the location of a defect.

Preferably comprising means for utilising data from the scanning means for:
identifying at least a seal region of the product and a contents region of said product; and
defining one or more masked regions, in which masked region(s) little or no detection of defects occurs, in the contents region or the seal region;
in order to improve detection of defects in the non-masked seal region or contents region.

Preferably, the detector system further comprises means for multi-point calibration of an X-ray detection apparatus, as defined in relation to the third aspect.

The invention also relates to a dual energy, X-ray absorptivity system, for detecting defects in products having a range of thicknesses of cross-section through which X-ray detection will take place, the system comprises:
low-energy, X-ray scanning means for identifying defects in a contents of said product and in a seal of said product, as per the second aspect; and
high-energy, X-ray scanning means for additionally identifying defects in a contents of said product.

Preferably, comprising visual output means in the form:
a first, low-energy image optimised to display defects in a contents of said product;
a second, low-energy image optimised to display defects in a seal of said product; and
a third, high-energy image optimised to display defects in a contents of said product.

According to a third aspect of the present invention, there is provided a method for multi-point calibration of an X-ray detection apparatus, for detecting defects in products, the method comprising:
turning off X-rays and detecting the "black level" signal for each diode in an array;
turning on X-rays at energy set point 1, and calculating the span or range of the output signal;
repeating this step for energy set points 2 to N;
calculating the multiplier profiles at each set point 1 to N necessary for each diode to have uniform output over its entire range;
writing that data back into respective sections of signal processing circuitry; turning off X-rays and re-reading the "black level" to calculate offset; and writing that offset data back into respective sections of signal processing circuitry to complete calibration.

Preferably, calculating the multiplier profiles for a dense region, for foreign body detection, and a light region, for seal fault detection.

This multi-point calibration methodology results in a 'piece-wise linear' relationship between each diode signal and its corresponding output signal. This relationship is used to enhance the image in light regions or dark regions, according to the signal path being used.

Alternatively, multi-point calibration may be replaced by a look-up table and a two-point calibration method.

The present invention also relates to a data carrier, disk, chip, computer, tablet or the like programmed to implement the method of the first or the third aspect, or a piece of software stored on any such device coded to implement the method of the first or the third aspect.

The present invention also relates to a method for detecting defects in a product having a range of thicknesses of cross-section through which detection will take place; the method comprising:

scanning the product to identify at least a first region of the product as distinct from a second region of the product, preferably by utilising dark image data;

using data relating to the first region to define a masked region, preferably in the light image data, in which masked region little or no detection of defects occurs, in order to improve detection of defects in the non-masked second region.

Alternatively, scanning the product to identify at least a first region of the product as distinct from a second region of the product, preferably by utilising light image data; using data relating to the first region to define a masked region, preferably in the dark image data, in which masked region little or no detection of defects occurs, in order to improve detection of defects in the non-masked second region.

Preferably, further comprising any one or more method features according to the first or third aspects.

The present invention may also relate to a method for detecting defects in a product having a range of thicknesses of cross-section through which detection will take place, substantially as herein disclosed, with reference to the accompanying description and/or any example described herein.

The present invention may also relate to a detector system, for detecting defects in products having a range of thicknesses of cross-sections through which X-ray detection will take place, substantially as herein disclosed, with reference to FIG. 1 of the accompanying drawings and/or any example described herein.

Advantageously, inspection of both dark regions and light regions is made possible at the same time. Further advantageously, detection of defects in the contents of a product and the seal of the product is conducted simultaneously. This improves the performance and functionality of scanning apparatus, as it improves the reliability of detecting defects which might heretofore have gone unnoticed. Downtime is reduced, and so too wastage, as sub-standard products can be easily identified and separated.

Advantageously, the two (or more) signal paths have substantially different conditioning parameters or characteristics, so as to create two (or more) contemporaneous images with each one optimised for a given purpose. That purpose can be to optimally identify artefacts such as light or dark features or to extract information to be used (for example, in masking) to better process the data resulting from one of the other signal paths.

As location of the seal defect is based upon using an adjacent region or sub-region along that part or side of the seal being considered as a reference, the product becomes its own floating reference, and detection is independent of physical properties of the seal or parameters of the X-ray system.

Use of a single sensor array provides perfect registration between the two output pictures, which have been, of course, created from the same set of scanning data.

High energy scanning may be included as a separate scanning operation, so as to improve detection of defects in the contents of the product, in particular bone detection.

Conditioning typically involves using the raw signal from the sensor array, which signal is conditioned by the internal circuitry of the detector apparatus, by one or more signal paths. The conditioning along each signal path may comprise any one or more of the group comprising:

analog conditioning followed by analog-to-digital conversion, to select the operating range of the sensor, along with filtration;

calibration, to normalise the response of each diode in the sensor, which may include "multi-point calibration";

consolidation of multiple pixels to minimise noise levels or achieve different response characteristics;

application of non-linear transfer functions by means of look-up tables, which may be used to "stretch" or compress the grey scale ranges; and extraction of feature data which is then combined with the image data, in which such features may be average grey-level information or profile data, and may be considered as meta data for that image.

As used herein the term 'means' is considered interchangeable with the term 'apparatus' or 'device'. As used herein, the term 'signal path' will be understood by those skilled in the art to apply to one or more connections through an FPGA (field programmable gate array), such that both signal paths are implemented through the same chip. However, an alternative to this would be to use two separate chips.

As used herein, the term 'hotspot' would not be regarded by those skilled in the art to mean most of the seal region but to mean those limited regions where additional processing is justified, which would typically be: a) a region related to a physical property of the packaging, such as a corner; or b) where foreign material has been detected on one side of the sea—potentially material extruded through the sealing process—such that the other side of the seal would then be analysed.

BRIEF DESCRIPTION OF THE DRAWING FIGURES

Figure 2B:
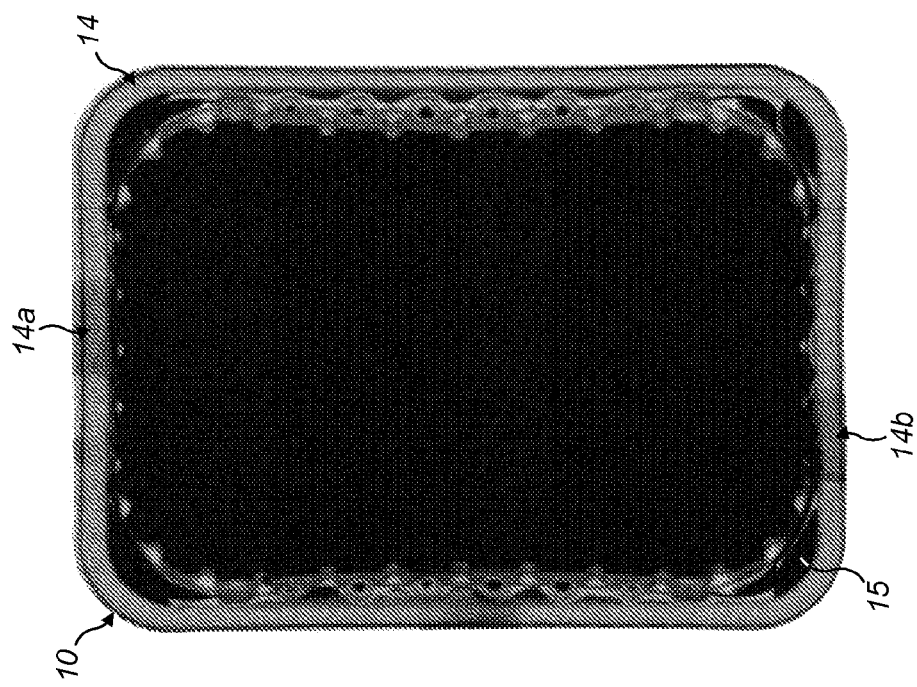
Figure 2A:
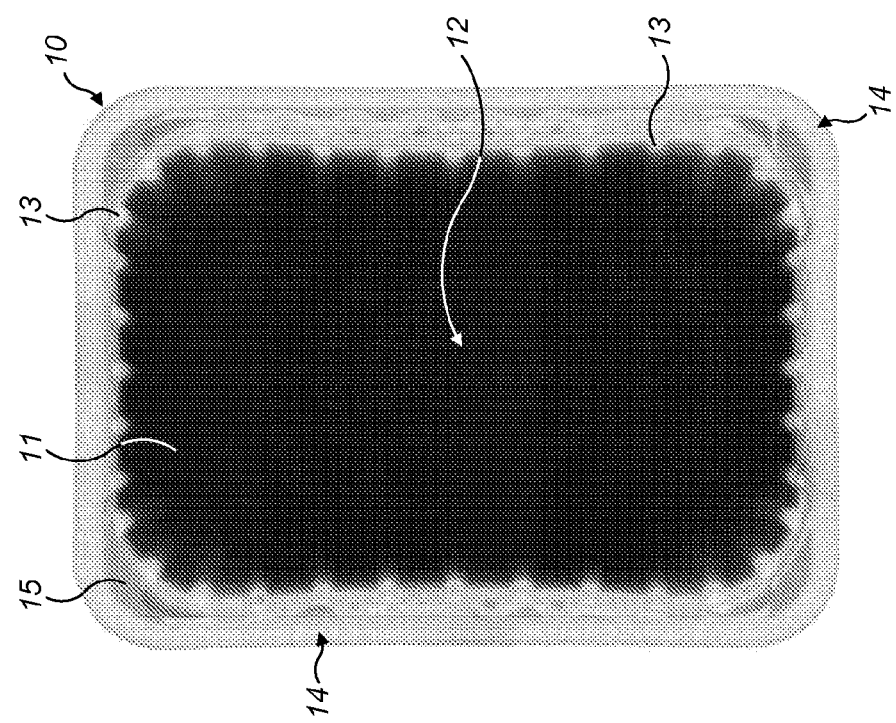
Figure 3B:
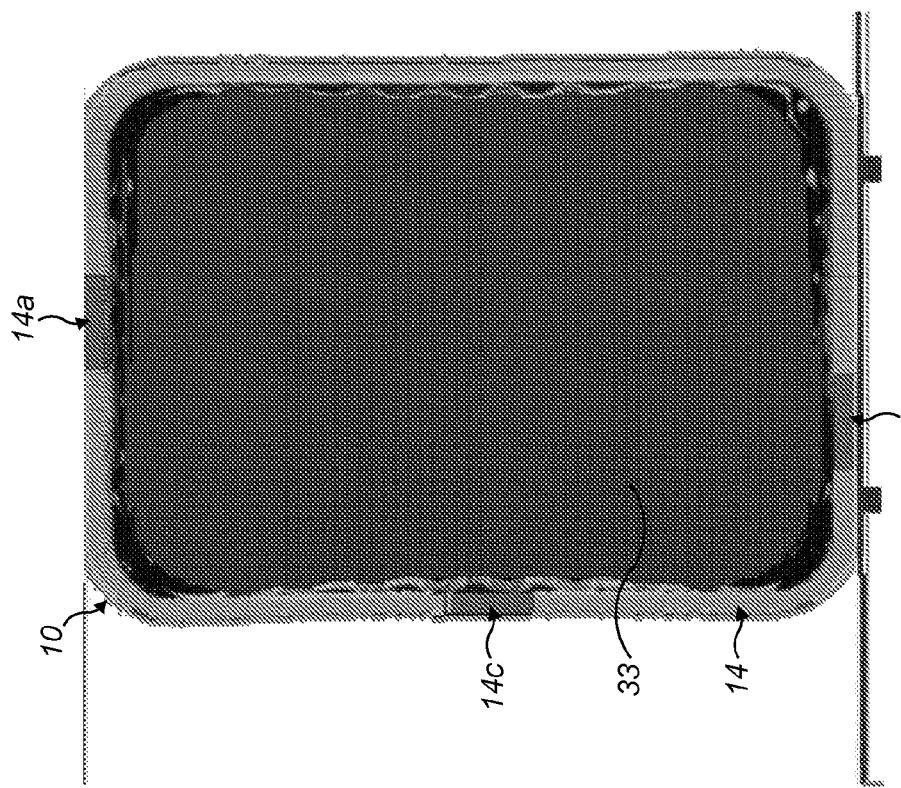
Figure 3A:
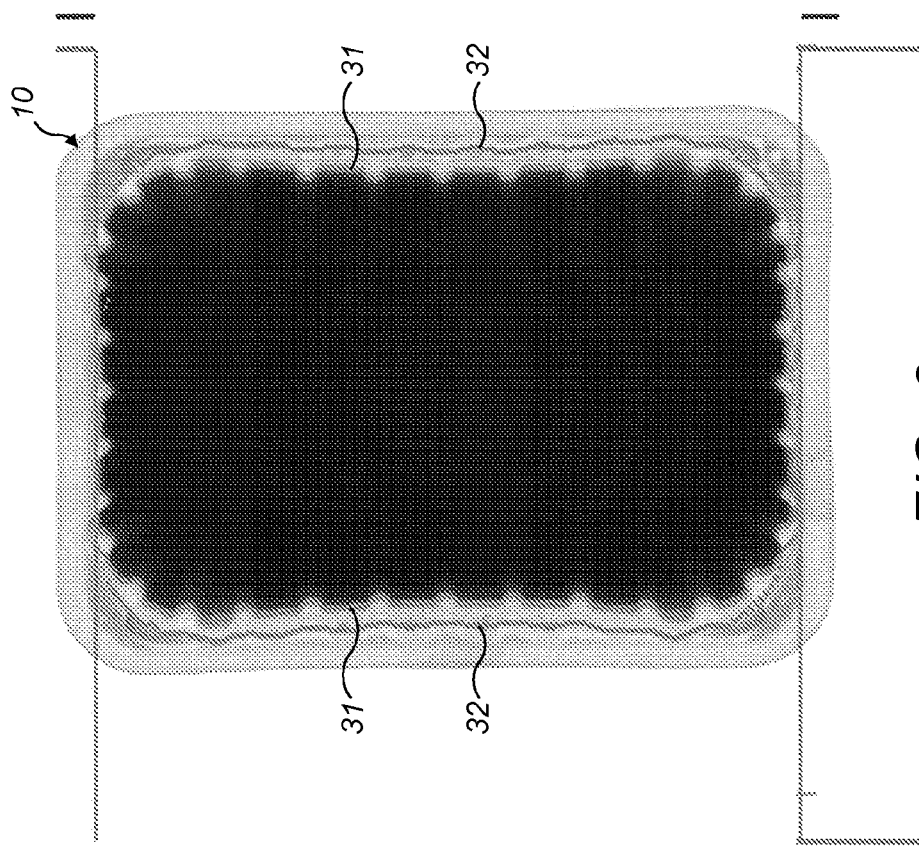
Figure 4A:
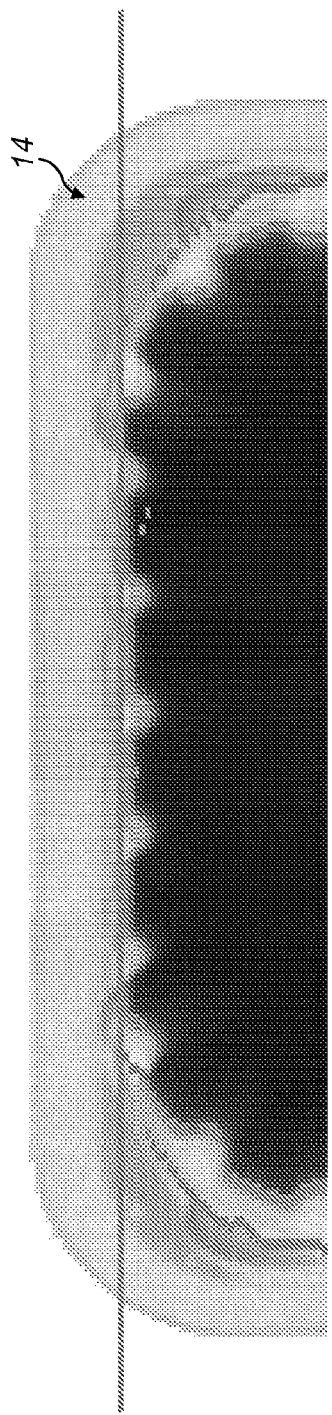
Figure 4B:
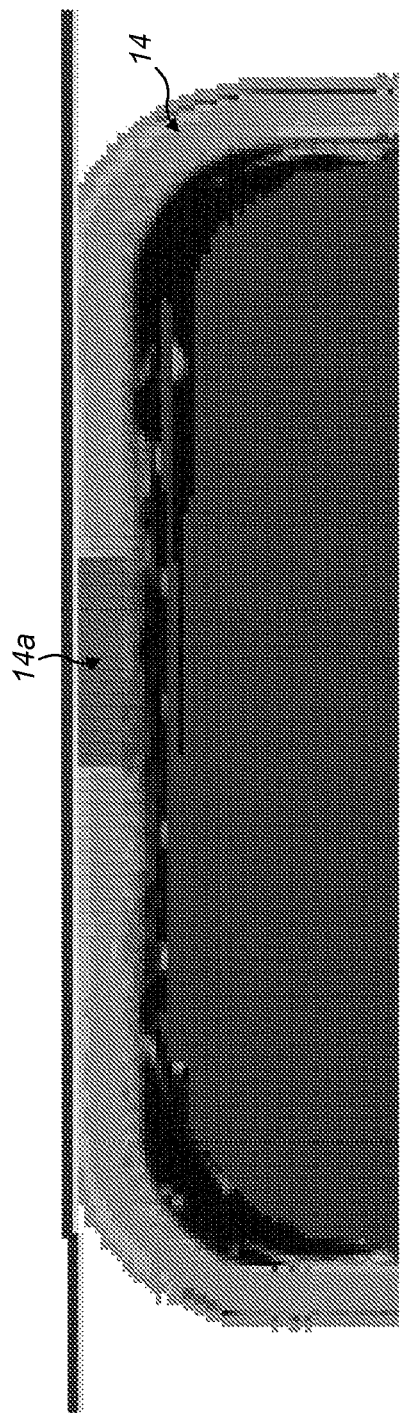
Figure 5A:
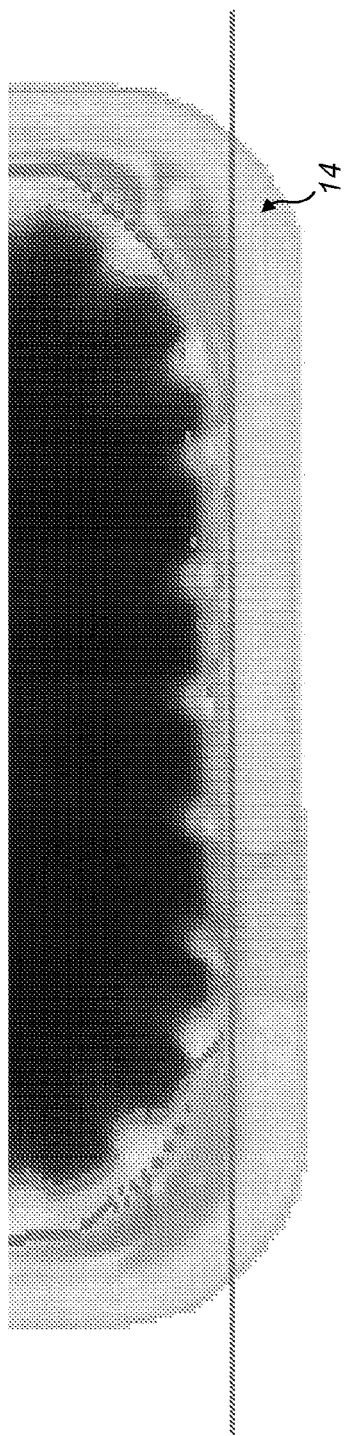
Figure 5B:
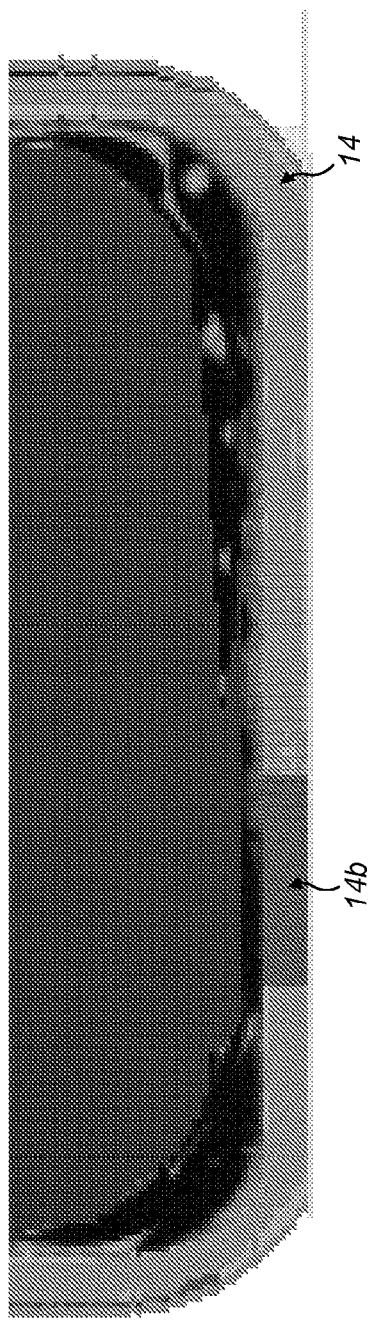
Figure 6:
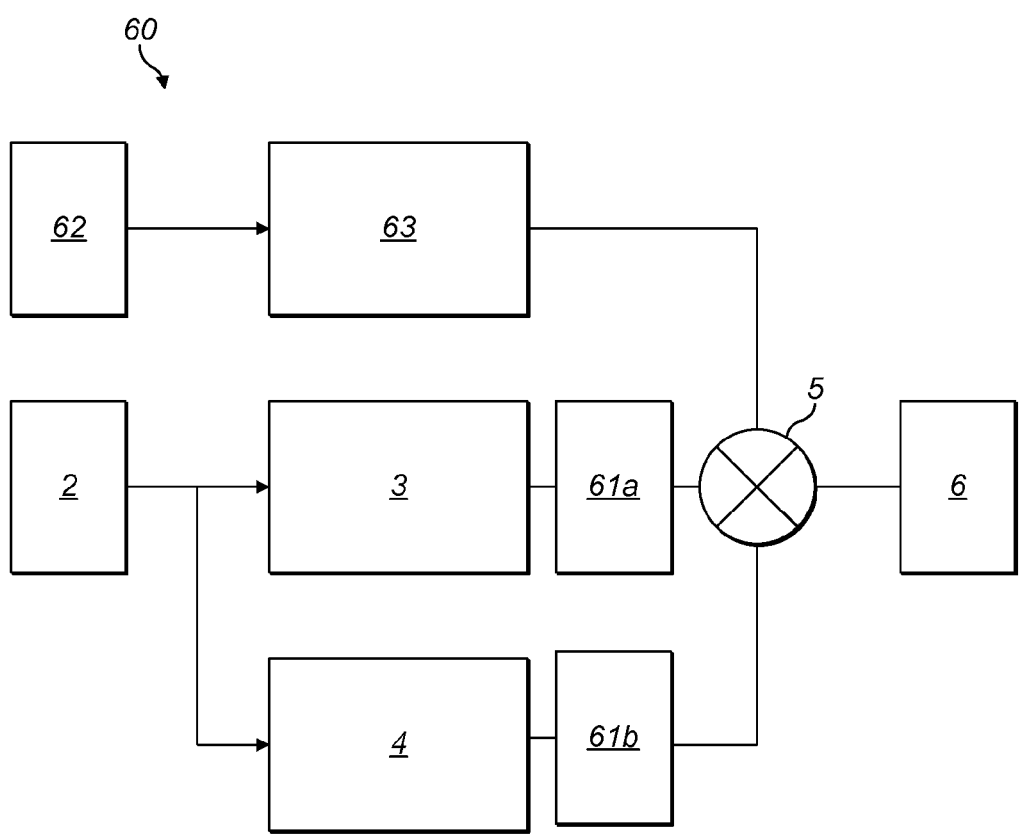

The invention will now be disclosed, by way of example only, with reference to the following drawings, in which:

FIG. 1 is a schematic view of an X-ray detector apparatus having separate means for conditioning two separate signal paths;

FIGS. 2*a* and 2*b* are output X-ray images from the apparatus of FIG. 1, following scanning a product;

FIGS. 3*a* and 3*b* are further output X-ray images from the apparatus of FIG. 1, with FIG. 3*a* being a non-masked output image and FIG. 3*b* being a masked output image;

FIGS. 4*a* and 4*b* are close-up, output X-ray images of a leading edge of the product;

FIGS. 5*a* and 5*b* are close-up, output X-ray images of a trailing edge of the product; and FIG. 6 is a schematic view of a dual energy, X-ray absorptivity apparatus incorporating aspects of the X-ray detector apparatus of FIG. 1.

DETAILED DESCRIPTION OF THE INVENTION

FIG. 1 shows an X-ray detector apparatus, identified generally by reference 1, which includes a low-energy, linear diode array 2, a first calibration and signal processor 3, a second calibration and signal processor 4, a data combiner 5, and output circuitry 6.

Linear diode arrays and the associated method for digitising X-ray images are known in the art; however, the present invention provides an improvement on standard X-ray detectors. The first calibration and signal processor 3 is optimised for a primary detection purpose, which is detection of dense contaminants in the contents of a product 10 to be scanned. The second calibration and signal processor 4 is optimised for a secondary detection purpose, such as detection of seal irregularities and/or contaminants in hotspots of the product 10. The outputs from calibration and signal processors 3; 4 is combined in the data combiner 5 before being sent on to the output circuitry 6.

The product 10, shown in FIGS. 2 to 5, is a tray 11 for holding a foodstuff, which has a thin, typically see-through, lid. The product 10 includes a central, flat-ish, contents receiving region 12, for receipt of the foodstuff, tray edges 13 extend upwardly from region 12 to form a receptacle, and are then outwardly extended so as to form a peripheral, seal region 14, where the lid is sealed to the tray 11. In addition, the location of a number of hotspots (in which some small bits of the foodstuff may occur) are shown by reference 15, which hotspots may appear in the upper-corners of the tray 11 near the seal region 14 after filling and sealing. The tray 11 is made from plastics, such as PET (polyethylene terephalate) and is up to approximately 60 mm high, but could be made from any suitable plastics or be of different size. The lid is made from thermoplastic material, such as PA (polyamide) or PE (polyethylene), and the tray is sealed to the lid through any number of known techniques. Specifically, the tray has been filled with water as an exemplary foodstuff prior to sealing; however, the foodstuff could have been any food, for example, ground beef or a couple of stacks of hamburgers. Those skilled in the art will know the further types of food/foodstuff which require scanning. Further, one or more pieces of masking tape have been added to the seal region 14, so as to simulate the presence of thinly extruded material in the seal. Of course, the use of masking tape is exemplary and used purely to simulate a seal defect.

The first calibration and signal processor 3 can be described as operating on a dense channel of the signal produced by the linear diode array 2, and the second calibration and signal processor 4 can be described as operating on a light channel of the signal produced by the linear diode array 2. Each calibration and signal processor 3; 4 operates independently and can provide an independent output X-ray image, even though they may be shown side-by-side. However, some data from the calibration and signal processor 3 is used to improve detection of defects in the seal region 14, which is ultimately shown in the output X-ray image from the calibration and signal processor 4.

FIGS. 2a and 2b show examples of output X-ray images, in which the first calibration and signal processor 3 has been used to create the image of FIG. 2a and the second calibration and signal processor 4 (with some input from the calibration and signal processor 3) has been used to create the image of FIG. 2b. The image of FIG. 2a is optimised to show contaminants in the dense regions of a product (the contents receiving region 12), which appears as the darker, central region in that Figure. In particular, it can be noted that the seal region 14 of the product 10 surrounding the much darker central region 12, has some areas of light and slightly darker grey-level; however, one cannot accurately identify any particular differences (contaminants) in the seal region 14 from that image. As for FIG. 2b, which has been optimised to display seal defects, the central region 12 of the product is black (and could not be used to identify contaminants in that region)—and so too are some non-central regions which are the hotspots 15—but there are clear distinctions between various parts of the seal region 14, especially around regions 14a, 14b, and 14c which indicate that a seal fault exists—as simulated by the masking tape in those regions 14a; 14b; 14c.

The way in which some data from the calibration and signal processor 3 is used to improve detection of defects in the seal region 14 is exemplified in relation to FIGS. 3a and 3b. In particular, geometric information relating to the contents of the product 10 from the dense channel image, FIG. 3a, is used to create mask data for defining the region of interest in the light channel image, FIG. 3b. From the image of FIG. 3a, a periphery 31 is initially approximated, which periphery is the boundary between the water in the tray 11 and the tray 11 per se. It is shown as being undulating owing to the actual shape of the tray 11, and the fact that the water would, of course, extend to the very tray edges 13. The periphery 31 is then dilated to provide an extended periphery 32, which is provided so as to remove from consideration the tray edges 13, and the extended periphery 32 is used to define a masked region 33, as shown in the image of FIG. 3b, which improves detection of defects in the non-masked seal region 14 of that Figure. Substantially little or no detection of defects occurs in the masked region, and this masked region is used to define the seal as the real are of interest. This method is implemented through a detection algorithm which, in addition, uses an adjacent region (or sub-region) of the seal along a side of the seal being considered as a reference. Further, parameters which are important during the analysis of the seal image are one or more of the following: degree of dilation; nominal seal width; and differentials between lights and darks of the seal.

The periphery 31 is created in FIG. 3a—normal calibration for detecting dense contaminants—by scanning outwards for a grey scale that is higher than a preset level. The extended periphery 32 is then created by a method such as extending this original periphery 31 by a set number of pixels, normal to the mean edge of the periphery. The extended periphery 32 is then applied to the image used to detect defects in the light region.

FIGS. 4a and 4b are close-up images of a leading edge of the product 10. They are each derived from the corresponding image of FIGS. 3a and 3b, and FIG. 4a is, therefore, a close-up of the top of FIG. 3a and FIG. 4b a close-up of the top of FIG. 3b. In a similar manner, FIGS. 5a and 5b are close-ups of the trailing edges of the product 10, as derived from the bottoms of FIGS. 3a and 3b respectively. In each of FIGS. 4a and 5a, it can be seen that the material representing the seal contaminant is almost entirely imperceptible in the images optimised for contents of the product 10, but clearly visible (regions 14a and 14b) in FIGS. 4b and 5b, being the images optimised for seal irregularities.

As the product being scanned is used as its own reference, and the scanning process produces grey-scale images, a comparison of the grey-levels in different regions/sub-regions is conducted. Light regions and dense regions of the seal are identified and compared to an average grey-level of the whole seal being considered. In order to make any potential irregularities in the seal region 14 more noticeable, colour-coding may be used. Where the seal is satisfactory, which equates to an average grey-level, those regions are coloured green. Darker than average regions are coloured blue. Regions which have been identified as having an excess number of dark points are coloured red, which represent seal faults. In this example, colouring blue/cyan indicates a potential anomaly, but red indicates a rejectable non-conformity. Regions which are lighter than average are, generally, of less or no interest.

In order to set-up the X-ray detector apparatus 1, a multi-point calibration method is implemented. The method involves the steps of:

turning off X-rays and detecting the "black level" signal for each diode in the array;

turning on X-rays at energy set point 1, and calculating the span or range of the output signal;

repeating this step for energy set points 2 to N;

calculating the multiplier profiles at each set point 1 to N necessary for each diode to have uniform output over its entire range, including the dense region for foreign body detection and the light region for seal fault detection;

writing that data back into respective sections of signal processing circuitry; turning off X-rays and re-reading the "black level" to calculate offset; and writing that offset data back into respective sections of signal processing circuitry to complete calibration.

Such calibration is used to define the working range of each detector in the array at greyscale zero (black), and at specific set points including at least the dense region set point(s) and the light region set point(s). A typical range of set points in the dense region (contents) could be about 0 keV to about 40 keV, and for the light region (seal), the range could be about 35 keV to about 40 keV.

A similar affect can be achieved, albeit in a less accurate implementation, by applying a look-up table to the data at the output of the signal processing sections 3 and 4. In this case, the look-up table would be different for the two signal paths. The present invention provides low photon energy scanning of products, through the use of a suitable X-ray generator having a broad spectrum of photon energies.

The present invention has been exemplified by reference to a product in which detection of the foreign contaminant is in a region (the seal) that is materially lighter that the normal product (the contents). However, the invention is also equally applicable to, and the technique substantially analogous, where there are features of the packaging which are materially denser than any foreign body, for example when scanning glass jars or bottles which have a dome or punt at the bottom. In particular, this method may involve scanning the product in a normal manner to inspect its contents and, at the same time, optimising the data stream for denser regions (rather than lighter as per seal inspection) to identify the location of the contaminant. The above invention is not considered similar to dual energy, X-ray absorptivity (DEXA), which would, at least, have separate sensor arrays for the different energies; however, the invention may be used as part of such an apparatus, as described below.

FIG. 6 shows a dual energy, X-ray absorptivity (DEXA) apparatus, identified generally by reference 60, which includes aspects of the apparatus of FIG. 1 and its methodology. As such, common references have been used to identify common features, which features will not be discussed again in detail.

As per FIG. 1, low-energy, linear diode array 2 is provided to scan a product, the first calibration and signal processor 3 is optimised for detection of dense contaminants, and the second calibration and signal processor 4 is optimised for detection of seal irregularities and/or contaminants in hotspots. The outputs from calibration and signal processors 3; 4 are combined in the data combiner 5 before being sent on to the output circuitry 6. By way of an alternative, following calibration and signal processors 3; 4 optional look-up tables 61a; 61b may be utilised.

High-energy scanning, for enhanced detection of bones, etc., is provided by linear diode array 62, in conjunction with a third calibration and signal processor 63, the output of which is also fed to the data combiner 5, and in turn the output circuitry 6. Linear diode array 2 is preferably selected to be responsive to photon energies below about 40 keV and linear diode array 62 is preferably selected to be responsive to photon energies from about 40 keV to about 100 keV. The purpose of DEXA is to compare the two image sets created by the different linear diode arrays 2; 62 so as to find regions of differential absorption, such as created by calcium in a bone that is embedded within a food matrix—the latter being essentially organic. The addition of linear diode array 62 adds to the functionality of an overall detector system, but operates independently and does not adversely affect operation of low-energy scanning used to identify seal defects and normal contents analysis.

In use, the above apparatus and associated method will provide three channels of data, such as: low-energy light channel, optimised for seal inspection; low-energy dense channel, optimised for foreign body inspection; and high-energy, un-optimised for use with dual energy analysis. However, in a further option, a four channel apparatus and associated method may be provided by: a low-energy light channel, optimised for seal inspection; a low-energy dense channel, optimised for foreign body inspection; a low-energy channel, un-optimised for use with dual energy; and a high-energy channel, un-optimised for use with dual energy.

The invention claimed is:

1. A method for detecting defects in a product having a range of thicknesses of cross-section through which detection will take place; the method comprising:

scanning the product to identify one or more light regions, and one or more dense regions of the product; and creating a first signal path and a second signal path from a single set of scanning data, conditioning the first signal path for detection of defects in the one or more dense regions; and conditioning the second signal path for detection of defects in the one or more light regions.

2. The method as claimed in claim 1 comprising using data relating to the one or more dense regions, or the one or more light regions so as to define one or more masked regions, in which one or more masked regions little or no detection of defects occurs, in order to improve detection of defects in one or more non-masked regions, the one or more light regions, or the one or more dense regions.

3. The method as claimed in claim 2 comprising:

utilising geometric data relating to the one or more dense regions, or the one or more light regions to define the one or more masked regions; and/or dilating data relating to the one or more dense regions, or the one or more light regions.

4. The method as claimed in claim 2 comprising:

analysing data from the one or more non-masked regions adjacent or surrounding the one or more masked regions; and/or analysing data from one or more non-masked hotspots.

5. The method as claimed in claim 4 comprising:

the step of either (i) analysing data within a sub-region of the non-masked region or a sub-region of the non-masked hotspot and comparing that data to a discreet, further sub-region of the non-masked region or further sub-region of the non-masked hotspot, respectively, so as to determine a location of a defect; or (ii) analysing data within the sub-region of the non-masked region or the sub-region of the non-masked hotspot and comparing that data to a discreet, adjacent further sub-region of the non-masked region or further sub-region of the non-masked hotspot, respectively, so as to determine a location of the defect.

6. The method as claimed in claim 5 comprising:
the step of either
(i) analysing data within a sub-region of a seal region or other region of the product, and comparing that data to a discreet, further sub-region of the seal region or other region of the product, so as to determine the location of the defect; or
(ii) analysing data within a sub-region of the seal region or other region of the product, and comparing that data to a discreet, adjacent, further sub-region of the seal region or other region of the product, so as to determine the location of the defect.

7. The method as claimed in claim 6 comprising the step of either (i) optimising detection in the signal paths by manipulating multiplier and/or offset data; or (ii) optimising detection in the signal paths by utilising a look-up table.

8. The method as claimed in claim 1 comprising utilising scanning data so as to provide a visual output in the form of:
a first image optimised to identify defects in contents of the product; and
a second image optimised to identify defects in a seal of the product, a hotspot or other region of the product.

9. The method as claimed in claim 8 further comprising utilising scanning data and adapting the first and/or second image so as to identify defects in hotspots or other regions of the product.

10. The method as claimed in claim 1 comprising scanning the product with X-rays to provide a single data stream which is used to separately, but simultaneously, derive a low-energy contents range analysis of the product and a low-energy seal range analysis of the product.

11. The method as claimed in claim 10 further comprising a high-energy contents range scan.

12. The method as claimed in claim 1 comprising scanning the product to identify at least a seal region of the product and a contents region of the product; and using data relating to the contents region or the seal region to define a masked region, in which masked region little or no detection of defects occurs, in order to improve detection of defects in a non-masked seal region or the contents region.

13. The method as claimed in claim 1 comprising analysis of X-ray product image data in order to establish the efficacy of a seal and/or any existence of contaminants in the seal, wherein one or more light regions and/or one or more dense regions of the seal are identified and compared to an average grey-level of the seal.

14. The method as claimed in claim 1 further comprising a method for multi-point calibration of an X-ray detection apparatus, the multi-point calibration method comprising:
(i) turning off X-rays and detecting a "black level" signal for each diode in an array of diodes;
(ii) turning on X-rays at energy set point 1, and calculating a span or range of an output signal;
(iii) repeating step (ii) for energy set points 2 to N;
(iv) calculating multiplier profiles at each set point 1 to N necessary for each diode to have uniform output over an entire range of the diode;
(v) writing data back into respective sections of signal processing circuitry;

(vi) turning off X-rays and re-reading the "black level" to calculate offset data; and
(vii) writing the offset data back into respective sections of signal processing circuitry to complete calibration.

15. The method as claimed in claim 14 comprising calculating the multiplier profiles for a dense region of the one or more dense regions, foreign body detection, a light region of the one or more light regions, and seal fault detection.

16. A detector system for detecting defects in products having a range of thicknesses of cross-section through which X-ray detection is configured to take place; the detector system comprising:
X-ray scanning means; and
means for utilising data from the scanning means for:
identifying one or more light regions, and one or more dense regions of said product; and
means for generating a first signal path and a second signal path from scanning data, means for conditioning the first signal path for detection of defects in the one or more dense regions; and
means for conditioning the second signal path for detection of defects in the one or more light regions.

17. The detector system as claimed in claim 16 comprising means for defining one or more masked regions, in which masked region(s) little or no detection of defects occurs, in the one or more dense light regions, or the one or more light regions; in order to improve detection of defects in non-masked regions, the one or more light regions, or the one or more dense regions.

18. The detector system as claimed in claim 16, further comprising visual output means for:
either (i) displaying defects in the one or more light regions and the one or more dense regions; or
(ii) displaying defects in the one or more light regions and the one or more dense regions at the same time.

19. The detector system as claimed in claim 18 further comprising visual output means in the form of either
(i) a first image optimised to display defects in contents of said product, and a second image optimised to display defects in a seal of said product; or
(ii) a first image optimised to display defects in the contents of said product, and a second image optimised to display defects in the seal of said product, and
the detector system is further configured for adapting the first or the second images to display defects in hotspots or other regions of said product.

20. The detector system as claimed in claim 16 further comprising:
either (i) means for analysing data within a sub-region of a seal region and comparing that data to a discreet, further sub-region of the seal region, so as to determine a location of the defect; or
(ii) means for analysing data within the sub-region of the seal region and comparing that data to a discreet, adjacent, further sub-region of the seal region, so as to determine the location of the defect.

21. The detector system as claimed in claim 16 further comprising means for generating geometric data relating to the one or more dense regions, or the one or more light regions to define the one or more masked regions.

22. The detector system as claimed in claim 16 comprising means for dilating such geometric data to define one or more masked regions.

23. The detector system as claimed in claim 16 wherein, in order to improve detection of defects in a non-masked seal region or contents region of the product, the means for utilising data from the scanning means is configured for:

identifying at least a seal region of the product and the contents region of said product; and defining one or more masked regions, in which masked regions little or no detection of defects occurs, in the contents region or the seal region.

24. The detector system as claimed in claim 16 configured to provide multi-point calibration of an X-ray detection apparatus, the detector system being configured for:

(i) turning off X-rays and detecting a "black level" signal for each diode in an array of diodes;

(ii) turning on X-rays at energy set point 1, and calculating a span or range of an output signal;

(iii) repeating step (ii) for energy set points 2 to N;

(iv) calculating multiplier profiles at each set point 1 to N necessary for each diode to have uniform output over an entire range for each diode;

(v) writing data back into respective sections of signal processing circuitry;

(vi) turning off X-rays and re-reading the "black level" to calculate offset data; and (vii) writing the offset data back into respective sections of signal processing circuitry to complete calibration.

25. A dual energy, X-ray absorptivity system, for detecting defects in products having a range of thicknesses of cross-section through which X-ray detection is configured to take place, the system comprising:

low-energy, X-ray scanning means as claimed in claim 16 for identifying defects in contents of said product and in a seal of said product; and high-energy, X-ray scanning means for additionally identifying defects in the contents of said product.

26. A method for detecting defects in a product having a range of thicknesses of cross-section through which detection will take place; the method comprising:

scanning the product to identify one or more light regions, and one or more dense regions of the product; and creating a first signal path and a second signal path from a single set of scanning data, conditioning the first signal path for detection of defects in the one or more dense regions; and conditioning the second signal path for detection of defects in the one or more light regions, wherein the method comprises using data relating to the one or more dense regions, or the one or more light regions so as to define one or more masked regions, in which one or more masked regions little or no detection of defects occurs, in order to improve detection of defects in one or more non-masked regions, the one or more light regions, or the one or more dense regions.

27. The method as claimed in claim 1, wherein the method comprises using data relating to contents of the product to define a masked region in which little or no detection of defects occurs, in order to improve detection of defects in a non-masked seal, hotspot or other region of the product.

* * * * *